United States Patent
Sampath et al.

(10) Patent No.: US 7,447,710 B2
(45) Date of Patent: Nov. 4, 2008

(54) DATABASE SYSTEM PROVIDING SELF-TUNED PARALLEL DATABASE RECOVERY

(75) Inventors: Srikanth Sampath, Fremont, CA (US); Fei Zhou, Glenview, IL (US); Girish Vaitheeswaran, Fremont, CA (US); Prasanta Ghosh, San Ramon, CA (US)

(73) Assignee: Sybase, Inc., Dublin, CA (US)

( * ) Notice: Subject to any disclaimer, the term of this patent is extended or adjusted under 35 U.S.C. 154(b) by 345 days.

(21) Appl. No.: 10/710,868

(22) Filed: Aug. 9, 2004

(65) Prior Publication Data

US 2005/0131853 A1 Jun. 16, 2005

Related U.S. Application Data

(60) Provisional application No. 60/481,774, filed on Dec. 11, 2003, provisional application No. 60/521,751, filed on Jun. 29, 2004.

(51) Int. Cl.
*G06F 12/00* (2006.01)
*G06F 17/30* (2006.01)

(52) U.S. Cl. .................. 707/202; 707/200; 707/204; 718/100; 718/104

(58) Field of Classification Search ........... 707/202, 707/200, 204; 718/100, 104
See application file for complete search history.

(56) References Cited

U.S. PATENT DOCUMENTS

| 5,280,611 | A | 1/1994 | Mohan et al. ............. 707/8 |
|---|---|---|---|
| 5,414,840 | A | 5/1995 | Rengarajan et al. ........ 707/201 |
| 5,446,884 | A | 8/1995 | Schwendemann et al. ... 707/202 |
| 5,499,367 | A | 3/1996 | Bamford et al. ............. 707/8 |
| 5,530,855 | A | 6/1996 | Satoh et al. ............. 707/201 |
| 5,553,303 | A | 9/1996 | Hayashi et al. ............. 707/2 |
| 5,561,795 | A | 10/1996 | Sarkar ..................... 707/202 |
| 5,561,798 | A | 10/1996 | Haderle et al. ............. 707/202 |
| 5,581,750 | A | 12/1996 | Haderle et al. ............. 707/202 |
| 5,596,706 | A | 1/1997 | Shimazaki et al. .......... 714/6 |
| 5,668,991 | A | 9/1997 | Dunn et al. ............... 707/202 |

(Continued)

OTHER PUBLICATIONS

Schmidt et al, "Alleviating Priority Inversion and Non-determinism in Real-time CORBA ORB Core Architectures", IEEE Realtime Technology and Applications Symposium (RTAS), Denver, Colorado, Jun. 3-5, 1998.*

(Continued)

*Primary Examiner*—Tim Vo
*Assistant Examiner*—Jay A Morrison
(74) *Attorney, Agent, or Firm*—John A. Smart; G. Mack Riddle

(57) ABSTRACT

A database system providing self-tuned parallel database recovery is described. In one embodiment, for example, in a database system, a method is described for performing recovery operations using an optimal number of recovery threads, the method comprises steps of: (a) spawning an initial recovery thread to perform recovery operations; (b) measuring I/O (input/output) performance with the initial recovery thread; (c) spawning a subsequent recovery thread to perform recovery operations; (d) measuring I/O performance with the subsequent recovery thread; and (e) as long as I/O performance does not degrade beyond a preselected percentage, repeating steps (c) and (d) for spawning a desired number of additional recovery threads. In another embodiment, the database system auto-tunes the cache during performance of database recovery operations to optimize the performance of recovery operations.

34 Claims, 8 Drawing Sheets

U.S. PATENT DOCUMENTS

| | | | | |
|---|---|---|---|---|
| 5,682,527 | A | 10/1997 | Cooper et al. | 707/202 |
| 5,717,921 | A | 2/1998 | Lomet et al. | 707/100 |
| 5,721,918 | A | 2/1998 | Nilsson et al. | 707/202 |
| 5,778,387 | A | 7/1998 | Wilkerson et al. | 707/202 |
| 5,857,180 | A | 1/1999 | Hallmark et al. | 707/2 |
| 5,933,838 | A | 8/1999 | Lomet | 707/202 |
| 5,956,504 | A | 9/1999 | Jagadish et al. | 707/101 |
| 5,974,425 | A | 10/1999 | Obermarck et al. | 707/202 |
| 6,018,746 | A | 1/2000 | Hill et al. | 707/202 |
| 6,065,017 | A | 5/2000 | Barker | 707/202 |
| 6,065,018 | A | 5/2000 | Beier et al. | 707/202 |
| 6,078,930 | A | 6/2000 | Lee et al. | 707/202 |
| 6,081,906 | A * | 6/2000 | Nishizawa et al. | 714/2 |
| 6,151,607 | A | 11/2000 | Lomet | 707/202 |
| 6,161,198 | A | 12/2000 | Hill et al. | 714/15 |
| 6,185,699 | B1 | 2/2001 | Haderle et al. | 714/19 |
| 6,202,071 | B1 * | 3/2001 | Keene | 707/202 |
| 6,208,918 | B1 | 3/2001 | Ando et al. | 701/35 |
| 6,247,023 | B1 | 6/2001 | Hsiao et al. | 707/202 |
| 6,377,959 | B1 | 4/2002 | Carlson | 707/202 |
| 6,411,968 | B2 | 6/2002 | Bamford et al. | 707/202 |
| 6,449,623 | B1 | 9/2002 | Bohannon et al. | 707/202 |
| 6,457,142 | B1 * | 9/2002 | Klemm et al. | 714/38 |
| 6,490,594 | B1 * | 12/2002 | Lomet | 707/200 |
| 6,507,853 | B2 | 1/2003 | Bamford et al. | 707/203 |
| 6,526,417 | B1 | 2/2003 | Perry | 707/202 |
| 6,567,928 | B1 | 5/2003 | Lyle et al. | 714/15 |
| 6,594,676 | B1 | 7/2003 | Moore | 707/202 |
| 6,609,136 | B2 | 8/2003 | Bamford et al. | 707/202 |
| 6,618,822 | B1 | 9/2003 | Loaiza et al. | 714/20 |
| 6,651,073 | B1 | 11/2003 | Lyle et al. | 707/202 |
| 6,651,077 | B1 | 11/2003 | East et al. | 707/204 |
| 6,658,589 | B1 * | 12/2003 | Taylor | 714/6 |
| 6,684,225 | B1 | 1/2004 | Huras et al. | 707/202 |
| 6,721,739 | B1 | 4/2004 | Mende et al. | 707/8 |
| 6,732,123 | B1 * | 5/2004 | Moore et al. | 707/202 |
| 6,751,636 | B1 | 6/2004 | Mende et al. | 707/200 |
| 6,769,074 | B2 | 7/2004 | Vaitzblit | 714/16 |
| 6,799,189 | B2 | 9/2004 | Huxoll | 707/204 |
| 6,820,217 | B2 | 11/2004 | Mock et al. | 714/15 |
| 6,886,021 | B1 | 4/2005 | Pal et al. | 707/204 |
| 6,889,159 | B2 * | 5/2005 | Klotz et al. | 702/122 |
| 7,007,200 | B2 * | 2/2006 | Salem | 714/26 |
| 7,028,303 | B2 * | 4/2006 | Lahey et al. | 718/106 |
| 7,047,309 | B2 * | 5/2006 | Baumann et al. | 709/232 |
| 7,207,043 | B2 * | 4/2007 | Blythe et al. | 718/104 |
| 7,237,242 | B2 * | 6/2007 | Blythe et al. | 718/105 |
| 2003/0177179 | A1 * | 9/2003 | Jones et al. | 709/203 |
| 2004/0015762 | A1 * | 1/2004 | Klotz et al. | 714/742 |
| 2004/0024921 | A1 * | 2/2004 | Peake et al. | 710/1 |

OTHER PUBLICATIONS

American National Standards Institute, Information Technology—Database languages—SQL (Ch 4), American National Standard ANSI/ISO/IEC 9075; 1992.

Date, C.J., An Introduction to Database Systems, Ch 1: Overview of Database Management, vol. 1, 5th Ed., 1990.

* cited by examiner

DATABASE SYSTEM PROVIDING SELF-TUNED PARALLEL DATABASE RECOVERY

CROSS REFERENCE TO RELATED APPLICATIONS

The present application is related to and claims the benefit of priority of the following commonly-owned, presently-pending provisional application(s): application Ser. No. 60/481,774, filed Dec. 11, 2003, entitled "Database System Providing Self-Tuned Parallel Database Recovery", of which the present application is a non-provisional application thereof; application Ser. No. 60/521,751, filed Jun. 29, 2004, entitled "Database System Providing Self-Tuned Parallel Database Recovery", of which the present application is a non-provisional application thereof. The disclosures of each of the foregoing applications are hereby incorporated by reference in their entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, size: 282445 Bytes, created: Jun. 29, 2004 4:09:46 PM; Object ID: File No. 1; Object Contents: Source code.

BACKGROUND OF INVENTION

1. Field of the Invention

The present invention relates generally to information processing environments and, more particularly, to improved methods for self-tuned parallel database recovery.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Volumes I and II", Addison Wesley, 1990; the disclosure of which is hereby incorporated by reference.

Increasingly, businesses run mission-critical systems which store information on database management systems. Each day more and more users base their business operations on mission-critical systems which store information on server-based database systems, such as Sybase® Adaptive Server® Enterprise (available from Sybase, Inc. of Dublin, Calif.). As a result, the operations of the business are dependent upon the availability of data stored in their databases. Because of the mission-critical nature of these systems, system availability is a critical need for today's businesses. Within the global business environment, business continuity has become essential with 99.999% availability a requirement for most organizations. Database applications, being an integral part of any IT infrastructure, demand a high degree of availability. It is essential that a database server is made available as quickly as possible after a planned shutdown (perhaps for maintenance activities), or an unplanned shutdown due to a hardware or software fault.

Whenever a database system crashes, an "active failover" system may take over the load (of the primary system that crashed). When this happens, there is a need for the system's databases to be recovered—that is, to bring the databases back into a consistent state.

During server re-start, a significant amount of time is spent on database recovery. With present-day systems, the typical approach employed is to recover each database serially (i.e., one at a time). For example, first the system databases may be recovered, followed by recovery of user databases one at a time. Given the length of time required to recover databases serially, there is much interest in finding an improved approach.

Recently, database vendors have attempted to improve database recovery by recovering databases concurrently. Therefore, instead of recovering one database at a time, the approach entails recovering multiple databases concurrently. The maximum degree of parallelism is equal to one less than the maximum number of database engines that a system begins with. For example, a single instance of Sybase® Adaptive Server® Enterprise (ASE) running five concurrent engines may undertake four (parallel) recoveries concurrently.

When recovering multiple databases concurrently, the performance of the system is limited by the performance of the underlying Input/Output (I/O) subsystem. Since database recovery is I/O intensive, the I/O subsystem presents a potential bottleneck to overall performance. The degree of parallelism is only available if the processing itself can be "parallelized." Since recovery is I/O bound, the recovery process may be stalled in the face of multiple concurrent I/O requests. For example, the underlying disk subsystem may experience a degree of "thrashing." In systems that use virtual memory (where data is moved into and out of virtual memory via "page swapping"), for example, the condition results from a hard drive being used excessively for virtual memory because the physical memory (i.e., RAM) is full. Disk thrashing considerably slows down the performance of a system because data has to be transferred back and forth from the hard drive to the physical memory. With serial recovery, thrashing tends to not be a problem as the system is just recovering one database at a time (with concomitantly lower I/O load). With concurrent database recovery, however, the system may be required to concurrently process several disparate I/O requests, for the many databases that are laid out separately on hard disk. In the presence of thrashing, the performance of concurrent database recovery may degrade to the point that it is worse than serial recovery. Accordingly, this problem poses a significant challenge to successfully implementing concurrent database recovery.

Current database systems may work in conjunction with an operating system that supports parallel I/O, so that the database system may take advantage of concurrent recovery. Expectedly, the performance of such a database system is dependent on the underlying I/O subsystem. If the underlying I/O subsystem does not provide good parallel performance, then database recovery suffers. In the state of the art today, there is no way (short of direct user configuration input) in which a database system may directly determine the level of I/O subsystem support that is really available for parallel database recovery. In other words, existing database systems today are not able to figure out what degree of parallelism should be used for concurrent database recovery. Even in instances where the DBA (database administrator/user) may manually configure the degree of parallelism, any incorrect input may result in system performance for concurrent recovery that is even worse than simple serial recovery. As the current approach to parallel database recovery does not really take into account how well the underlying I/O subsystem provides parallel performance, the current approach is suboptimal.

Given the foregoing shortcomings, there is a need for a database system that takes into account how well the underlying I/O subsystem really provides parallel performance. Ideally, the system should operate in an automated manner to determine the degree of parallelism that should be used after a system crash or failover, so that the system is essentially self-tuning and thus capable of providing self-tuned parallel database recovery. The present invention fulfills these and other needs.

SUMMARY OF INVENTION

A database system providing self-tuned parallel database recovery is described. In one embodiment, for example, in a database system, a method of the present invention is described for performing recovery operations using an optimal number of recovery threads, the method comprises steps of: (a) spawning an initial recovery thread to perform recovery operations; (b) measuring I/O (input/output) performance with the initial recovery thread; (c) spawning a subsequent recovery thread to perform recovery operations; (d) measuring I/O performance with the subsequent recovery thread; and (e) as long as I/O performance does not degrade beyond a preselected percentage, repeating steps (c) and (d) for spawning a desired number of additional recovery threads.

In another embodiment, for example, a database system of the present invention performing recovery operations using an optimal number of recovery threads is described that comprises: a database system having at least one database that may require recovery; an initial recovery thread that is spawned to perform recovery operations, wherein the system measures I/O (input/output) performance for the initial recovery thread; and a plurality of additional recovery threads that are spawned to perform recovery operations, wherein the system measures I/O (input/output) performance for each additional recovery thread that is spawned, and wherein the system ceases spawning additional recovery threads when I/O performance degrades beyond a desired amount.

In yet another embodiment, for example, in a database system, an auto-tuning method of the present invention is described for performing database recovery, the method comprises steps of: spawning a thread to perform database recovery and recording statistics about performance associated with that thread; attempting to spawn additional threads to perform database recovery and recording statistics about performance associated with each additional thread spawned; and if the performance for a given thread degrades beyond a desired amount, freezing execution of the thread and ceasing any attempt to spawn additional threads for database recovery.

In another embodiment, for example, in a database system having a cache for database operations, a method of the present invention is described for auto-tuning the cache to optimize database recovery operations, the method comprises steps of: partitioning the cache such that it includes memory allocation for both a large I/O (input/output) pool and a small I/O pool; during normal database operation, increasing the small I/O pool's memory allocation in the cache, so that the cache is optimized for random access retrieval of data pages using memory from the small I/O pool; and during database recovery operation, increasing the large I/O pool's memory allocation in the cache, so that the cache is optimized for sequential retrieval of log pages using memory from the large I/O pool.

In still another embodiment, for example, in a database system having a cache for database operations, a method of the present invention is described for optimizing the cache for retrieval of pages for database recovery operations, the method comprises steps of: during normal database operations, making a portion of the cache available for prefetching pages by bringing pages into the cache before the pages are used; during database recovery operations, increasing the portion of the cache available for prefetching pages, so as to optimize the cache for retrieval of pages for database recovery operations; and after completion of the database recovery operations, decreasing the portion of the cache available for prefetching pages so as to restore the portion of the cache available for prefetching pages for normal database operations.

DETAILED DESCRIPTION

Glossary

Figure 1:
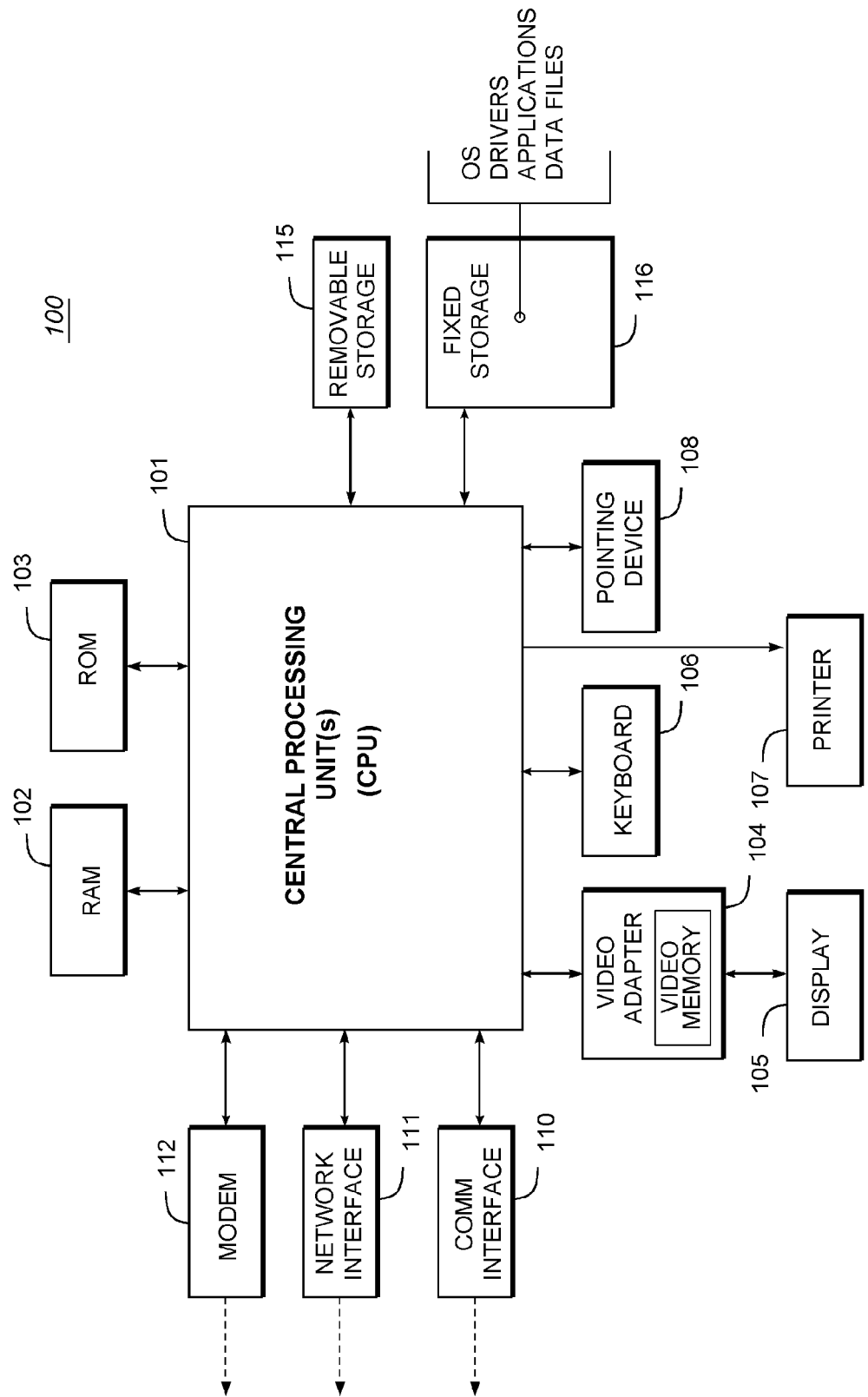
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

Checkpoint Task: The system task that is started during system startup is referred to as the checkpoint task. The checkpoint task is responsible for determining and spawning checkpoint worker tasks that do the actual job of checkpointing databases.

Checkpoint Worker Task: Checkpoint worker tasks are tasks that are spawned by the system checkpoint task and do the actual job of checkpointing databases when parallel checkpoints are enabled.

Failover: Failover refers to an event triggered by the failure of a primary database server in which another designated secondary database server automatically replaces the primary and takes over the responsibilities including access to all the databases of the primary.

HA: The term HA (high availability) normally refers to the extent of availability of services offered by a system (e.g., a database system such as Sybase® Adaptive Server® Enterprise available from assignee Sybase, Inc. of Dublin, Calif.).

Recovery Tuning Task or Tuning Thread: The recovery tuning task (or thread) is the initial task (during startup) or the failover task (during a failover) that determines the number of recovery threads and spawns the recovery worker tasks. The spawned recovery worker tasks usually recover the databases. The recovery tuning task is responsible for tuning the default data cache for recovery and also for determining the optimal number of recovery threads.

Recovery Worker Task or Worker Thread: The recovery worker tasks (or threads) are the tasks that are spawned by the recovery tuning task and recover the databases.

Self-tuning: Self-tuning refers to the methodology of the present invention in which a system configures its resources and operations without human intervention in order to provide better performance.

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 9075-(1-5)-1999 (formerly ANSI/ISO/IEC 9075-(1-5)-1999), the disclosure of which is hereby incorporated by reference.

Thread: A thread refers to a single sequential flow of control within a program. Operating systems that support multi-threading enable programmers to design programs whose threaded parts can execute concurrently. In some systems, there is a one-to-one relationship between the task and the program, but a multi-threaded system allows a program to be divided into multiple tasks. Multi-threaded programs may have several threads running through different code paths simultaneously.

INTRODUCTION

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Computer-Based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y.

Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
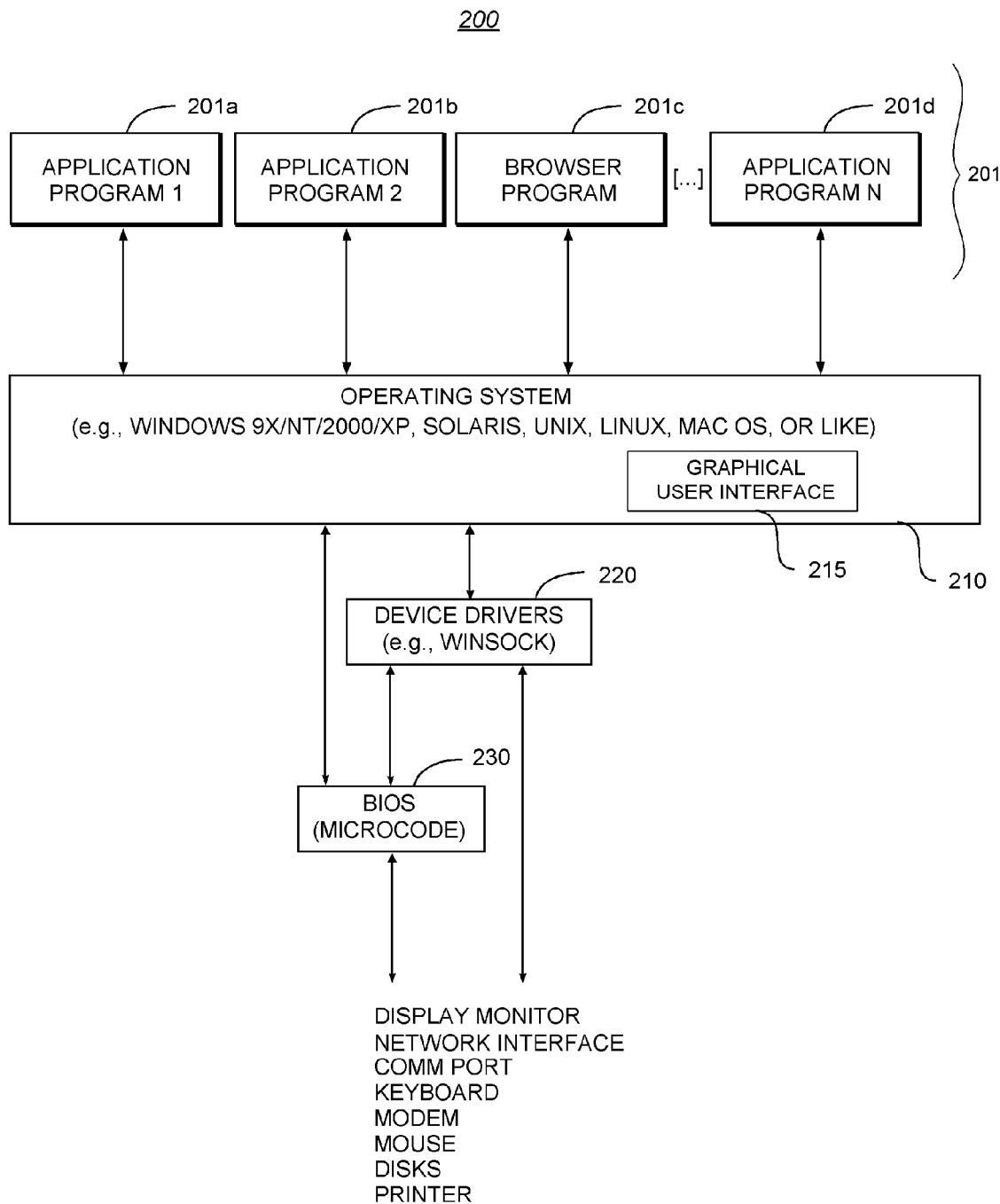
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable computer-executable instructions, for example, for downloading and installation from an Internet location (e.g., Web server).

Software system 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

Client-Server Database Management System

Figure 3:
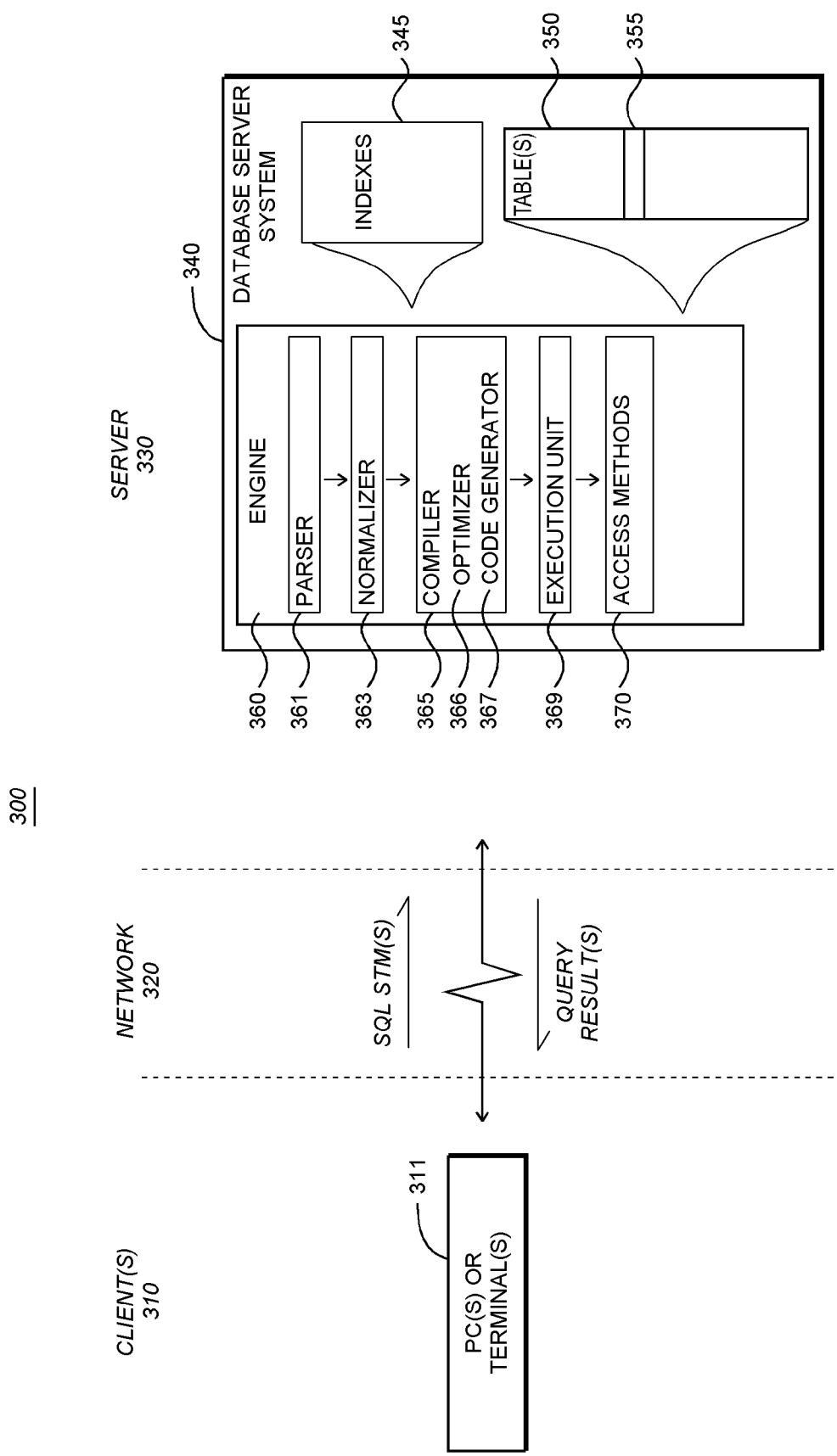
FIG. 3 illustrates the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 3 illustrates the general structure of a client/server database system 300 suitable for implementing the present invention. As shown, the system 300 comprises one or more client(s) 310 connected to a server 330 via a network 320. Specifically, the client(s) 310 comprise one or more standalone terminals 311 connected to a database server system 340 using a conventional network. In an exemplary embodiment, the terminals 311 may themselves comprise a plurality of standalone workstations, dumb terminals, or the like, or comprise personal computers (PCs) such as the above-described system 100. Typically, such units would operate under a client operating system, such as Microsoft® Windows client operating system (e.g., Microsoft® Windows 95/98, Windows 2000, or Windows XP).

The database server system 340, which comprises Sybase® Adaptive Server® Enterprise (available from Sybase, Inc. of Dublin, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, Wash.), UNIX (Novell), or Linux (Red Hat). The network 320 may be any one of a number of conventional network systems, including a Local Area Network (LAN) or Wide Area Network (WAN), as is known in the art (e.g., using Ethernet, IBM Token Ring, or the like). Network 320 includes functionality for packaging client calls in the wellknown SQL (Structured Query Language) together with any parameter information into a format (of one or more packets) suitable for transmission across a cable or wire, for delivery to the database server system 340.

Client/server environments, database servers, and networks are well documented in the technical, trade, and patent literature. For a discussion of Sybase®-branded database servers and client/server environments generally, see, e.g., Nath, A., "The Guide to SQL Server", Second Edition, Addison-Wesley Publishing Company, 1995. For a description of Sybase® Adaptive Server® Enterprise, see, e.g., "Adaptive Server Enterprise 12.5 Product Documentation", available from Sybase, Inc. of Dublin, Calif. This product documentation is available via the Internet (e.g., currently at sybooks.sybase.com/asg1250e.html). The disclosures of the foregoing are hereby incorporated by reference.

In operation, the client(s) 310 store data in, or retrieve data from, one or more database tables 350, as shown at FIG. 3. Typically resident on the server 330, each table itself comprises one or more rows or "records" (tuples) (e.g., row 355), each storing information arranged by columns or "fields". A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the clients 310 issue one or more SQL commands to the server 330. SQL commands may specify, for instance, a query for retrieving particular data (i.e., data records meeting the query condition) from the database table(s) 350. The syntax of SQL (Structured Query Language) is well documented; see, e.g., the above-mentioned "An Introduction to Database Systems". In addition to retrieving the data from database server table(s) 350, the clients 310 also include the ability to insert new rows of data records into the table. In addition, the clients can also modify and/or delete existing records in the table(s).

In operation, the SQL statements received from the client(s) 310 (via network 320) are processed by engine 360 of the database server system 340. Engine 360 itself comprises parser 361, normalizer 363, compiler 365, execution unit 369, and access methods 370. Specifically, the SQL statements are passed to the parser 361 which converts the statements into a query tree—a binary tree data structure which represents the components of the query in a format selected for the convenience of the system. In this regard, the parser 361 employs conventional parsing methodology (e.g., recursive descent parsing).

The query tree is normalized by the normalizer 363. Normalization includes, for example, the elimination of redundant data. Additionally, the normalizer 363 performs error checking, such as confirming that table names and column names which appear in the query are valid (e.g., are available and belong together). Finally, the normalizer 363 can also look-up any referential integrity constraints which exist and add those to the query.

After normalization, the query tree is passed to the compiler 365, which includes an optimizer 366 and a code generator 367. The optimizer is responsible for optimizing the query tree. The optimizer 366 performs a cost-based analysis for formulating a query execution plan. The optimizer will, for instance, select the join order of tables (e.g., when working with more than one table); it will select relevant indexes (e.g., when indexes are available). The optimizer, therefore, performs an analysis of the query and selects the best execution plan, which in turn results in particular access methods being invoked during query execution.

For enhancing the storage, retrieval, and processing of data records, the server 330 maintains one or more database indexes 345 on the database tables 350. These database indexes 345 facilitate quick access to the data records. A database index, typically maintained as a B-Tree data structure, allows the records of a table to be organized in many different ways, depending on a particular user's needs. An index may be constructed as a single disk file storing index key values together with unique record numbers. An index key value is a data quantity composed of one or more fields from a record which are used to arrange (logically) the database file records by some desired order (index expression). The record numbers are unique pointers to the actual storage location of each record in the database file. Both are referred to internally by the system for locating and displaying records in a database file.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., database server) that communicates with one or more "clients" (e.g., personal computers such as the above-described system 100). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview of Embodiment of Self-Tuned Parallel Database Recovery

In accordance with the present invention, a database system is provided with improved concurrent database recovery. In particular, the system takes into account how well the underlying I/O subsystem really provides parallel performance. In the currently preferred embodiment, the system allows the DBA to set a configuration parameter that specifies a maximum number of concurrently recovered databases (i.e., preconfigured maximum). This establishes an upper limit of maximum concurrently recovered databases. The parameter may be set to a value of zero or a positive integer. With a value of zero (i.e., self-tuning option), the parameter specifies that the database system should automatically determine how well the underlying I/O subsystem supports parallel I/O and thus automatically determine the degree of parallelism that is optimal for the system. In the currently preferred embodiment, the system uses statistical I/O sampling techniques to determine the degree of parallelism that the I/O subsystem optimally supports for concurrent database recovery. Setting the configuration parameter to a positive integer (i.e., user-specified option) allows the DBA to override this automatic determination. In this case, the system simply behaves in a conventional manner by setting the degree of parallelism to the DBA-provided value and spawns a corresponding number of threads for concurrent database recovery.

The system of the present invention, implemented in the commercial embodiment of Sybase® Adaptive Server® Enterprise (ASE), provides a number of features to ensure continuous availability, including a highly available (HA) Active-Active hot standby in which two ASE servers can be configured as companions to each other. When the primary ASE server fails, the secondary ASE server takes over the connections and databases of the primary in what is referred to as HA failover. Each ASE server includes a single running instance of the database system, which in turn may have spawned a number of separate database engines (e.g., five concurrent engines). The database system operates in conjunction with a recovery subsystem for implementing the methodology of the present invention for improved concurrent database recovery by auto-tuning the degree of parallelism to be used for database recovery.

Recovery of databases is essential after a shutdown, in order to reconcile the transaction log and data. The transaction log in a database essentially represents the difference between the in-memory state of a database at the time of the shutdown, and its persistent (on-disk) state. The in-memory image is the most recent, and the persistent state represents the last image saved to disk. During database recovery, the persistent state of the database is updated to the pre-crash, in-memory state. Then, to maintain transactional consistency, incomplete transactions are undone using the transaction log.

During a server restart after a planned or unplanned shutdown, or during HA failover, a significant portion of time is spent on database recovery. Faster recovery enables databases to be available (online) earlier and minimizes database downtime. Of particular importance are system crashes and HA failover as these are unplanned events. The system of the present invention provides several features to enable databases to recover and return online quickly. Generally, they fall into two categories: (1) runtime features that result in less work during recovery by keeping the difference between the in-memory state and the persistent state of a database to a minimum without any significant impact on runtime performance; and (2) recovery time features that make use of available server resources intelligently to recover and bring a database online faster. The following discussion focuses on features of the present invention that improve the database recovery process and, therefore, also serve to increase system availability. These features speed recovery from planned shutdowns, unplanned crashes, and HA failovers.

One aspect of the present invention is to make use of all the available resources in the server such as additional engines to improve recovery performance. The engines that are configured for startup time will be brought online after all system databases are recovered. Then the initial recovery thread (which is referred to herein as the "tuning thread") will spawn recovery threads to recover user databases concurrently. The tuning thread will determine the number of threads to spawn in a self-tuning fashion based on the user's configuration and the load that the I/O subsystem can handle.

In addition, resources are tuned at recovery time to optimize for recovery performance. Before the tuning thread spawns recovery threads, it will tune the default data cache (i.e., the cache used by recovery) to aid recovery performance. The approach of the present invention provides that the server will use some heuristics as optimal values for some tuning factors such as the buffer pools size and APF (asynchronous prefetch) percentage for the pools. There is no single optimal value for all the different configurations. The heuristics that are used mainly improve the performance on high-end systems (i.e., machines with a fast I/O subsystem, large cache, and multiple CPUs, etc.). However, it is also ensured that there is no degradation in the performance on low-end systems.

The runtime features include providing users with the ability to configure a pool of checkpoint threads. This is especially useful if there are a number of active databases generating a lot of dirty buffers. A single checkpoint thread might become a bottleneck and might not be able to keep pace with the amount of dirty buffers being generated. This could cause recovery to slow down. A pool of checkpoint threads can be more efficient in flushing the dirty data to disk thereby reducing the amount of work that must be performed during recovery. Before describing the system and methodology of the present invention for self-tuned parallel database recovery in greater detail, the general process for database recovery will next be described.

Database Recovery

Figure 4:
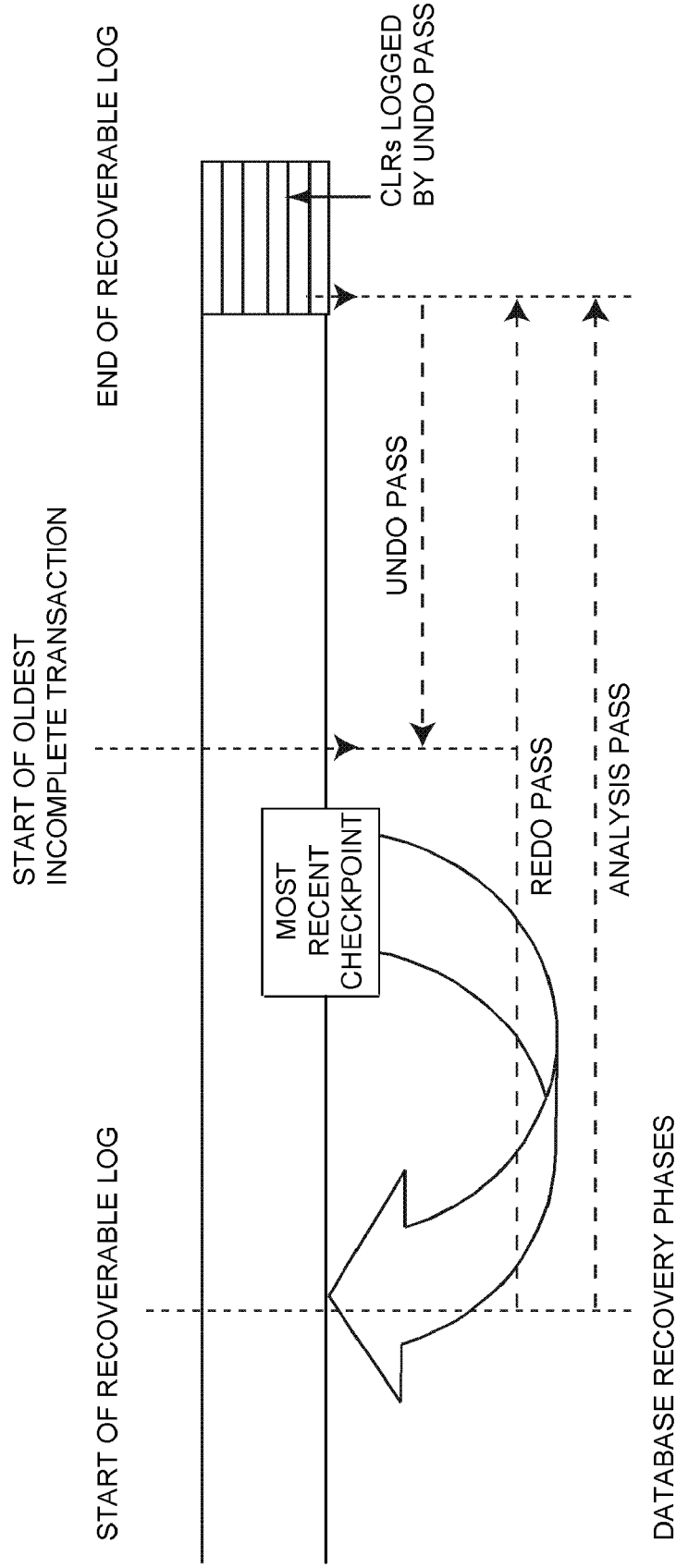
FIG. 4 is a diagram that illustrates database recovery phases.

FIG. 4 is a diagram that illustrates database recovery phases. As shown, recovery of a database is broadly made up of five phases and involves three passes of the transaction log:

1. Setup Phase

The setup phase involves finding the bounds of the transaction log that needs to be recovered. This portion of the transaction log is referred to as the "recoverable log."

2. Analysis Pass

The analysis pass involves a single forward scan of the recoverable log. This pass builds up information about transactions that will be acted upon by the subsequent passes. No data or index pages (hereafter referred to as data pages for convenience) are accessed in this analysis pass.

3. Redo Pass

The redo pass involves a single forward scan of the recoverable log. Every log record that reflects a modification made to a page is conditionally redone based on the timestamp on the data page and the timestamp stored in the log record. Each redo action generally involves: (1) reading in the data page and using its timestamp to determine if a redo is necessary; and (2) redoing the modification if the timestamp on the page is earlier than the time stamp in the log record. At the end of the redo pass, the state of the database reflects the in-memory state of the database at the time of the shutdown. No log records are written in this pass.

4. Undo Pass

The undo pass involves a single backward scan of the transaction log, from the end of the recoverable log back to the first log record of the oldest incomplete transaction. During this phase, incomplete transactions are undone. For each log record in each incomplete transaction, this pass involves: (1) reading in the data page to undo the changes; and (2) logging a Compensation Log Record (a CLR) to reflect the changes that have been undone. At the end of the undo pass, the state of the database reflects a transactionally consistent version of the in-memory state of the database at the time of the shutdown.

5. Final Phase

The final phase includes checkpointing, cleaning up the default data cache, and bringing the database online. This phase checkpoints the database to make the recovery changes persistent and performs other administrative functions like ensuring that data and log space accounting is correct. The overall sequence of a recovery operation in the currently preferred embodiment of the present invention will next be described.

Overall Sequence of Recovery Operation

The overall sequence of a recovery operation may be summarized as follows. When a server has crashed, there is a discrepancy between the data residing on disk and corresponding data residing in memory when the system crashed. This discrepancy may be resolved by using the system's transaction log as described above. In effect, during recovery the database system applies the transaction log to the persistent data to bring the data back into a consistent state. All the user databases must be recovered before they can be used by external clients.

When the database server comes back up (i.e., restarts) after a crash, the database server initially only has a single database engine (Engine 0) running. The system databases are recovered first on Engine 0. After that, the server may now accept user connections. Now, all engines that are configurable to be online during system startup are brought online. The starting thread ("init task") can proceed to recover user databases in parallel by a self-tuned number of recovery threads. Of particular interest to the present invention is the process of how this self-tuned number of recovery threads is derived.

The databases themselves are recovered using the system's data cache (memory), which is a system resource. During recovery, for example, the system must read into memory the log records and the data pages. In accordance with a second aspect of the present invention, certain properties of the default data cache may be fine-tuned to help with recovery performance. Significantly, the system may auto-tune parameters of the default data cache (sometimes referred to as the "recovery cache") to help recovery performance without any intervention from the DBA/user of the system.

After the transaction log records are read into the data cache, the system (using recovery routines) must redo or undo actions as reflected by the transaction log, so that the data pages are restored to a consistent state. The data cache is an integral resource that is used by the recovery subsystem to do its work. It is beneficial to performance to have certain parameters or values set for the data cache, based on how the system surmises recovery is going to proceed. These parameters are typically recovery specific—and that is, what is good for recovery is not necessarily good for normal run-time operation. Furthermore, typically a DBA tunes database parameters, including data cache parameters, for normal runtime operation (not database recovery) in order to help normal runtime performance, as that is the vast majority of work performed by a database system. In accordance with the present invention, when the system operates in database recovery mode, the system automatically self-tunes the data cache parameters (i.e., set to recovery-specific parameters) to optimize the database recovery process. After the end of recovery, the original values are restored. The runtime features and recovery features of the currently preferred embodiment of the present invention will now be described.

Runtime Features

Parallel Checkpoint

Prior art systems often provide for one system checkpoint task to perform checkpointing on all the active databases. The checkpoint task writes out modified data buffers to the disk, thus reducing the amount of recovery work in the event of a crash. However, a single checkpoint task can become a bottleneck in a system with multiple active databases. Therefore, the checkpoint of any database may be delayed and the number of modified buffers that have not been written to disk may be unnecessarily high.

The system of the present invention provides for a pool of checkpoint tasks that work in parallel on the list of active databases. This pool is controlled by a new configuration parameter, "number of checkpoint tasks." More checkpoint tasks translate to shorter recoverable logs and less recovery work in the event of a crash, thus improving availability.

The default value for "number of checkpoint tasks" is 1 (serial checkpoint). The number of engines and number of open databases limit the value for this parameter. Currently, the maximum value for this parameter is 8. This configuration parameter is dynamic. When the value for this parameter is reduced, checkpoint tasks drain out, and when the value is increased, additional tasks are spawned.

The effectiveness of parallel checkpoint tasks is dependent on the layout of the databases and performance of the underlying I/O subsystem, because checkpointing is I/O intensive. The configuration parameter should be tuned depending on the number of active databases and the ability of the I/O subsystem to handle writes. If the system checkpoint task terminates due to a software fault, another checkpoint task is automatically started.

Housekeeper Wash

At runtime during idle cycles, the housekeeper writes modified buffers to disk, thus reducing the need for the recovery process to redo these changes. To further enhance this feature, the system of the present invention has a dedicated task, HK_WASH. The extent of writes by the housekeeper is controlled by the configuration parameter, "housekeeper free write percent." The default value is usually optimal. If the housekeeper task terminates due to a software fault, another housekeeper task is automatically started.

Data and Log Space Accounting

Accounting of data space is performed before a database is automatically brought online at the end of recovery, depending on the database option "no free space acctg." The value of TRUE speeds recovery because there is no need to reconcile free space. However, thresholds on data segments are disabled with this option set. If data thresholds are not essential for a particular database, this option can be set to TRUE to speed database recovery. Free space information for the transaction log, in any database with a dedicated log, is maintained as part of a database checkpoint. This vastly increases the speed at which the database can be brought online.

Page Flush Time Stamp (PFTS)

An important activity in the redo pass of recovery is reading in data pages to determine whether a redo is needed based on the timestamp check. As the ASE working set changes, modified pages are written out. Also, tasks such as the housekeeper and checkpoint tasks write out modified pages. At runtime, the latest timestamp on every page (called the page flush time stamp or PFTS) is noted when it is written to disk. The PFTS for the page is consulted during the recovery redo pass in order to determine if the on-disk image is already up-to-date, thus eliminating the need to read the page from disk. This step reduces the number of redundant reads, which would otherwise be a considerable expense to recovery.

Recovery Time Features

Early Onlining of Engines

In prior art database systems providing for serial database recovery, the sequence of events at start-up is generally as follows:

1) System databases were recovered on Engine 0;
2) Server accepted user connections;
3) User databases were recovered on Engine 0 serially; and
4) Other engines that were configured to be online at startup were brought online.

For the duration of recovery of user databases, one engine (Engine 0) typically serviced both user database recovery and online clients. Although applications could use the database system after the system databases were recovered, other engines were brought online only after all databases were recovered.

With the system of the present invention, in contrast, all engines that are configured to be online at startup are brought online once system databases are recovered. In its currently preferred embodiment, the following is the typical sequence of events at startup:

1) System databases are recovered on Engine 0;
2) Server accepts connections;
3) All Engines configurable to be online during startup are brought online; and
4) User databases are recovered in parallel by a "self-tuned" number of recovery threads in the default data cache with recovery tuned parameters.

During an HA failover user databases that failover will be recovered and brought online in parallel taking advantage of the engines that are online in the secondary database server. To facilitate parallel recovery, it is suggested to configure the maximum number of engines to be online at startup. The "self-tuning" aspect of the present invention for parallel database recovery is described below.

Self-Tuned Parallel Recovery

The system and methodology of the present invention provides for database recovery (e.g., during startup and after HA failover) in parallel by multiple recovery tasks. As database recovery is an I/O intensive process, the effectiveness of parallel recovery depends on the bandwidth of the underlying I/O subsystem. The system of the present invention provides a self-tuning system for determining the optimal number of parallel recovery tasks depending on the capabilities of the I/O subsystem.

In the currently preferred embodiment, the number of recovery tasks is dependent on a "max concurrently recovered db" configuration parameter. The maximum value is dependent on other configuration parameters: the number of online engines and the number of open databases. Currently, the maximum value cannot be bigger than either one less than the number of engines at startup, or the number of open databases, whichever is smaller. The default value of 0 indicates that the database system should adopt a self-tuning approach in which it does not make any assumptions on the underlying storage architecture. With this self-tuning approach, statistical I/O sampling methods are used to determine the optimal number of recovery tasks depending on the capabilities of the underlying I/O sub-system. If the value of this "max concurrently recovered db" configuration parameter is not 0, the database system spawns as many tasks as indicated by the configuration parameter. If the value is set to 1, it means that the server will recover in serial mode. The system of the present invention also provides an advisory if the number of threads it determines to be optimal is different from that specified by the user (e.g., system administrator).

This configuration parameter is a dynamic parameter. It can be changed while recovery is still going on. Currently, the only value it can be changed to while recovery is in progress is 1, to make the server go back to serial recovery. The configuration parameter cannot presently be changed if the server is still in a tuning state. If a user decides to switch back to serial recovery while recovery is in progress, the server will gradually drain the spawned recovery threads by making them exit before they try to pick up the next database to recover. Before the last recovery thread exits, it will wake up the tuning thread. When the tuning thread is woken up, it will check to see if there are still any databases to recover. If there are any databases remaining, it will then recover them in a serial mode.

The "self-tuning" approach for determining the actual number of recovery threads spawned generally proceeds as illustrated by the following example. The server spawns one recovery thread (T1) that starts recovering a database and collects an I/O statistic (S1) for a certain amount of time (time t). After time t, the server starts another recovery thread (T2) that recovers the next database. The server collects the I/O statistic (S2) for the same duration t. If the I/O subsystem is able to handle the I/O load, S2 should not be significantly lower than S1 (i.e., should not indicate significant degradation). If that is the case, the server considers parallel recovery to be beneficial, and spawns another recovery thread and this process continues until the number of threads are equal to the configured max number of databases that can be recovered concurrently or the number of user databases.

However, at any point of time, if Si is significantly less than S (i-1))(e.g., more than 15% less), then recovery thread Ti is frozen (sleeps) at a logical point (such as the end of a recovery phase). Then, a stable state is considered to have been achieved. Recovery is then performed with (i-1) threads. The ith thread is thawed (awakened) by any of the first (i-1) recovery threads when it is ready to take on the next database and the ith thread resumes from its frozen place.

If the configuration value is non-zero, that is the user has specified a degree of parallelism, the system continues to spawn recovery threads and keeps track of the statistics. Once an optimal state is reached as determined by the system of the present invention, it prints out an advisory in the error log. Once a steady state is reached, the server does not tune any further. During recovery, if for any reason the user (e.g., system administrator) desires to change the number of recovery threads, the user can reconfigure it to serial recovery ("1") as described above. The parallel recovery threads drain out after recovering the database that they are working on.

As described below in greater detail, the I/O statistic chosen for sampling is the number of physical reads done in the system for the time duration "t" starting with Phase 1 of recovery. Since recovery has to read in the log pages and data pages to recover, this is considered as a good statistic. However, a statistic is considered valid only if in the duration "t" (when the statistic is taken) recovery is not beyond the first recovery phase (i.e., the setup phase in which the bounds of the transaction log to be recovered are determined). If recovery is past this phase before time "t", then statistic gathering for the server is considered invalid, another thread is spawned and the tuning is restarted for the next database.

Once the server has reached the stable state, the tuning thread will go to sleep until woken up by the last recovery thread. The tuning thread can be woken up after all databases are recovered, during failover in the event an error is encountered, or when user instructs the server to go back to serial recovery. If the user instructs the server to go back to serial recovery, the tuning thread will continue recovering databases in serial mode.

Recovery Order

Users can also specify the order in which databases are recovered for all or a subset of user databases. Users can configure more critical databases to be recovered earlier using the stored procedure "sp_dbrecovery_order." In the currently preferred embodiment of the present invention, parallel recovery tasks determine the next database to be recovered according to the user-specified sequence. The databases without user defined order are recovered in the order of their database IDs. The time to recover a database is dependent on many factors such as the size of the recoverable log. Hence, databases may finish recovering in a different order than the start order defined by the user. For example, consider a case in which the recovery order of database "sales" is before "history." Parallel recovery will start recovery of "sales" before "history." However, it is possible that "sales" will take longer to recover and will be brought online after "history."

In some cases, applications use database recovery order to enforce the time when user connections are let in into the server. For applications that need to enforce that databases are brought online in the same order as the recovery order, the database system of the currently preferred embodiment provides a "strict" option in the stored procedure sp_dbrecovery_order. With the "strict" option specified, databases are brought online as specified by the recovery order. Consider for example, databases DB1, DB2, DB3, DB4, DB5 to be recovered in that order. If the application allows a user to login to database DB5 (e.g., because DB5 happens to be the default database), then by strictly enforcing recovery order, databases DB1, DB2, DB3, DB4 would have already been recovered. Alternatively, with the (default) value of "relax" specified, the databases are brought online immediately after recovery has been completed, as long as it does not violate some other "strict" order.

Self-Tuned Recovery Cache

Another aspect of the present invention exploits the access patterns during recovery and automatically tunes the default data cache for optimal recovery performance. During recovery, the transaction log is accessed in a predictable (serial) fashion. Data pages, however, do not have a predictable access pattern and can be considered random in nature. Hence, it is beneficial to use a large I/O size for accessing the transaction log. The system of the present invention will use a pool with the largest possible I/O size in the default data cache for log I/O, irrespective of whether that pool has been configured. For example, on a database server with a page size of 4K, access to the transaction log will make use of the 32K pool (i.e., a pool about eight times the 4K page size). This will result in fewer physical I/Os through the prefetching of log pages. Data accesses will continue to use the default pool in the default data cache.

The system of the present invention recognizes the benefit of using the largest possible pool for log I/O and will dynamically create the pool if it is unavailable. Also, if the large pool is available but the size is not optimal, the system will dynamically resize it and the default pool for optimal recovery performance. Once recovery of all user databases is complete, the original pool configurations are restored. The system optimizes the pool sizes by making use of the memory that is already allocated to the default data cache. As recovery uses only the default data cache, cache configurations should ensure that there is a large amount of default data cache for recovery. Recovery will not use memory from caches other than the default data cache.

Self Tuned Asynchronous Prefetch

Asynchronous prefetch (async prefetch or "APF") is a mechanism by which pages are prefetched before they are actually used when the page access pattern is known. Recovery makes use of asynchronous prefetch, the extent of which is governed by the configuration variable "local async prefetch limit," which indicates the percentage of buffers in the pool that can be prefetched. During recovery, the system of the present invention self-tunes this percentage to an optimal value. At the end of recovery, the original values are restored. Async prefetch is used by both log and data accesses. Async prefetch on the transaction log brings in 256 log pages at a time. During each recovery pass, recovery not only prefetches the data pages that need to be processed, but also consults the PFTS map to decide whether to prefetch the pages, thus avoiding redundant I/Os.

Case Study

Figure 5:
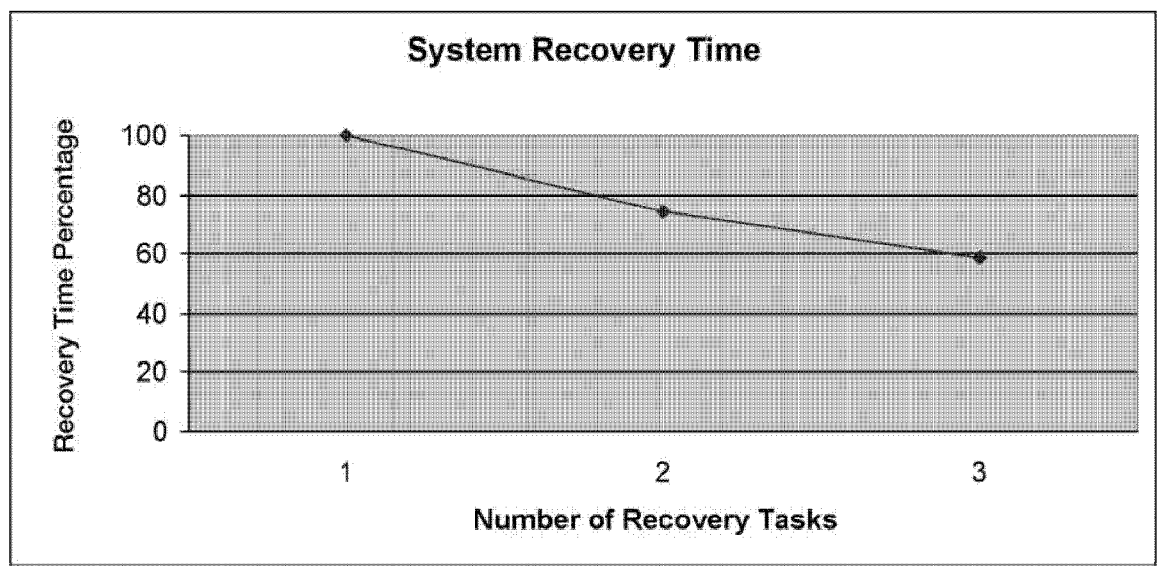
FIG. 5 is a graph showing system recovery time.

FIG. 5 is a graph showing system recovery time. The graph shows the reduction in system recovery time due to parallel recovery on a sample system of three databases with a default data cache of 5 GB, a data size of 16 GB with a recoverable log of 600 MB per database, and a log size of 4 GB per database. As shown at FIG. 5, as more tasks are used to recover databases, the system recovery time decreases. It is preferable to have a large default data cache to maximize the advantages from parallel recovery. A similar experiment has shown that parallel checkpointing with two concurrent checkpoint tasks on five active databases reduces recovery time over 225 percent without any impact on the runtime throughput.

To improve system recovery time it is recommended that databases should have the log and data on their own physical devices. The access patterns for the log and data are different and hence should be separate. The underlying I/O subsystem should also be configured in such a way that it is able to handle concurrent I/O requests from multiple databases in ASE. For guidelines, refer to the "Optimizing Transaction Performance in Adaptive Server 12.5" technical white paper (available from assignee, Sybase, Inc.).

Detailed Operation

The following description includes description of processes and method steps that may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

Determination of the Number of Recovery Threads Used for Concurrent Recovery

As a base statistic, the system of the present invention monitors or samples the number of physical reads performed. The basic approach is as follows. At the start, the system spawns a first thread and measures the number of physical reads performed in a certain unit of time. This measurement indicates the number of successful physical reads in the system that occurred with one thread spawned. In the currently preferred embodiment, the unit of time chosen for sampling is one second. For each valid sample, three sample sets are recorded and an average determined. As discussed below, there is an "acceptable zone" where the statistic is considered valid. Now, the system spawns another thread and repeats the measurement of physical reads performed in a certain unit of time. The system may continue in this matter spawning threads one by one and monitoring how well the I/O subsystem is able to keep up, as reflected by the ongoing measurement of successful physical reads performed in a certain unit of time. As the threads are spawned, the system may determine mine the point at which there is degradation in the I/O subsystem. In this manner, the system may determine how well the underlying I/O subsystem is able to handle the concurrent recovery load (i.e., the I/O load as a result of recovery), as that load is incrementally increased.

In order to understand what is the acceptable zone, it is helpful to review the phases of recovery. As described above and illustrated at FIG. 4, recovery includes five phases, which each recovery thread goes through. The first phase is the setup phase. Here, the system determines the bounds of the transaction log that needs to be recovered. Other phases include the analysis pass, the redo pass, the undo pass, and the final phase (which includes checkpointing, cleaning up the default data cache and bringing the database online). When a statistic is recorded, the system should ensure that the workload given to the I/O subsystem is uniform. If the workload is not uniform, the statistics gathered from one unit of time to another may not be comparable. Therefore, each time a thread is spawned, there should be some workload that is measurable and comparable with other gathered statistics. The setup phase is of particular interest for determining statistics, as it is the one phase that has massive continuous reads of the transaction log, with relatively little CPU processing. Note also that since recovery has not yet occurred, no significant online activity is occurring yet—that is, online access to user databases is not occurring. Importantly, the bulk of the server work occurring at this point is recovery related.

The analysis phase also includes read operations of the transaction log. However, the analysis phase has the particular disadvantage (for purposes of statistics gathering) that log pages that have been previously read during the setup phase will already reside in system cache. Therefore, access to those pages will occur through logical reads, not physical ones.

Each recovery thread goes through each of the five phases in database recovery. For example, as a second thread begins the setup phase, the first thread may still be in its setup phase or it may have moved on to a subsequent phase. Nevertheless, each time the physical read statistic is captured, at least one thread is guaranteed to be in the setup phase. A degradation limit is set to a preselected value, 15% in the currently preferred embodiment. As long as the system does not degrade more than 15% (of the previously-captured statistic), the system continues to spawn additional recovery threads (up to a specified maximum number).

Upon encountering a spawned thread that exceeds the acceptable degradation limit, the system "freezes" that thread (i.e., sleeps on the thread). In other words, the system delays the running of that thread until one of the prior threads completes its work. Consider, for example, the scenario where three threads have been spawned and upon spawning a fourth thread the system encounters unacceptable degradation (e.g., statistic degraded more than 15% compared to prior measurement). Here, the system would freeze the fourth thread, but allow the other three prior threads to continue with concurrent recovery. Thus in this case, the system has auto-tuned recovery to a degree of parallelism equal to 3. As each thread finishes the work of recovering one database, that thread proceeds to recover another database (i.e., of any databases that remain to be recovered).

Consider the recovery of 10 databases, DB1-DB10, by the above mentioned three concurrent threads. At the beginning, the three threads will be processing recovery of the first three databases, say DB1-DB3. When the fourth thread is spawned, it begins with the next database to be recovered, say (at this point in time) DB4. However, in this scenario, the system freezes (i.e., pauses or delays the running of) the fourth thread, to prevent unacceptable degradation in performance. When the first thread finishes (completes) recovery of DB1, it will observe that the fourth thread is sleeping/frozen on DB4. At this point, the first thread wakes the fourth thread and then exits. The fourth thread now proceeds to recover DB4, and then will continue with concurrent recovery of other remaining databases in cooperation with the second and third threads. Thus, ultimately concurrent recovery proceeds with three remaining threads, which is the degree of parallelism that the system has automatically determined can be handled without unacceptable degradation.

The amount of recovery that needs to be performed is based on the amount of the recoverable log. There may be instances where the databases are not very active or an instance where the DBA has recently set a checkpoint in the transaction log (with no incomplete transactions). In those cases, the amount of the recoverable log is small. By the time sampling can be completed, it is possible that the system may have already crossed the acceptable zone (which is in the setup phase), because the recoverable log is not big enough. If a statistic goes beyond the acceptable zone during sampling, it is considered to be an invalid statistic. Under such circumstances, the system continues to optimistically spawn threads. In other words, in the face of an invalid statistic, the system will optimistically spawn another thread.

The setup phase finds the bounds of the transaction log. Here (during the setup phase), the system starts from a known checkpoint marker and then traces through to the end of the log. Ordinarily, after this point the system would have collected a valid statistic and may proceed to the analysis phase. However, if the system reaches the end of the log before it has finished collecting a valid statistic (e.g., average of three 1 second samples), the system will then start reading the log from the start of the recoverable log to the checkpoint, in an effort to simulate workload (for determining an optimum degree of parallelism). During this workload simulation, the relevant thread may break out of the simulation (i.e., proceed to analysis phase) at the point when it has surmised a valid statistic.

Statistics Collection (Sampling)

As described above, the degradation limit is set to a preselected value, which is 15% in the currently preferred embodiment. As long as the system does not degrade more than 15%, the system continues to spawn additional recovery threads (up to a specified maximum number). In other words, as long as the current statistic is no less than 85% of the previous statistic, it will not be considered as an unacceptable degradation in performance, and therefore more threads will be spawned. During testing, it was found that when the requests from recovery reach the capacity of the I/O subsystem, the statistics would normally drop dramatically (e.g., more than 50%). The 15% degradation limit which is used in the currently preferred embodiment serves to filter out relatively minor performance variations which are not related to the I/O subsystem capacity. However, those skilled in the art will appreciate that a different percentage can be used for determining when performance degradation occurs, as desired.

One reason for using the number of completed reads as the sampling mechanism is based on the I/O pattern during recovery. In the five phases of recovery, namely setup phase, analysis phase, redo phase, undo phase, and final phase, the first (set-up) phase only involves massive continuous physical reads of log pages between the recovery checkpoint and the end of the log with little CPU activity and this constitutes the "acceptable zone," while the redo and undo phases involve both reads and writes, and the final phase does mainly writes. The analysis phase involves only reads. However, the log pages may be cached and the reads may end up being logical reads and hence will not be an acceptable zone either.

Since all spawned threads will first go through the first phase of recovery as soon as they are spawned, and because of this I/O pattern of recovery, the number of physical reads done within the server should be a good representation of the system's I/O throughput. One will have the best representation of the I/O subsystem if all the recovery threads spawned are within the first phase. However, it is possible for threads spawned earlier to have entered into the other phases while the server is still in the tuning process. In such situations, although the read counters then will not be the best representation of the I/O system, the system of the present invention will still consider the statistic valid.

If the task has completed the first phase (setup phase) within the sampling period, if the database server is still in the tuning process, then an additional pass is done by the recovery task. This pass involves reading of the log pages between the first log marker (marker to the oldest active transaction) and the recovery checkpoint marker. This phase will simulate the acceptable zone, i.e., massive continuous physical reads in the system. This logic is incorporated in a "rec___read_log( )" routine. If during this pass, the tuning period is complete, the recovery task stops the read of log pages and continues with the analysis phase.

If the last spawned thread enters into the analysis phase before the statistics collection is done (i.e., it has completed the setup phase within the statistics collection period (2-3 seconds)), the last statistic is considered to be invalid. This means that the database only has a very small recoverable log and the statistics collected in such a case will not represent the I/O subsystem performance. If an invalid statistic is found, the server will ignore the last statistic collected and continue spawning another thread and then start the statistic collection again.

When the server is tuning for recovery, for the logbounds (setup) phase, ASE will not use large pools for log I/O so as not to overwhelm the I/O subsystem. Overwhelming the I/O subsystem can lead to misleading statistics. The default pool will be used for log I/O for the tuning period.

Note that this is only when ASE is tuning during recovery for optimal number of recovery tasks. Also note that the bulk of the I/O during the regular recovery process (apart from tuning) is reading data pages that use only the default I/O pool. Hence, using default I/O also gives a better representation of the I/O subsystem during sampling. Once tuning is complete, large I/O is used for the log.

Several state values are used for the tuning process:

REC_INFO_TUNE_COMPLETE: This status bit marks the end of the recovery tuning process. When this bit is not set, users will not be able to change the configuration value for the "max_concurrently_recovered_db". It will be set once the server has reached a stable state.

REC_INFO_COLLECT_STAT: This status bit is used to control the start and end of collecting each statistic.

REC_INFO_INVALID_STAT: This status bit is set when the last spawned thread enters the analysis phase while the server is still in the tuning process. When this bit is set, the tuning thread will stop collecting more statistics and mark the collected samples invalid. It will then continue to spawn the next recovery thread.

Boot Recovery

The following interface is defined for boot recovery:
1: dorecover( )
2: rec_build_recovery_info( )
3: rec___boot_recover_dbs( )
4: rec_getnextdb_by_dbid( )
5: rec_run_parallel_recovery( )
6: rec___tune_bufpools( )
7: rec___stat_degraded( )
8: rec___collect_statistics( )
9: rec___freeze_recovery_thread( )
10: rec_freeze_thread( )
11: rec___parallel_hdlr( )
12: rec_getnextdb_to_recover( )
13: boot___recover_and_online( )

Overall Control Flow of Recovery Operation

Figure 6A:
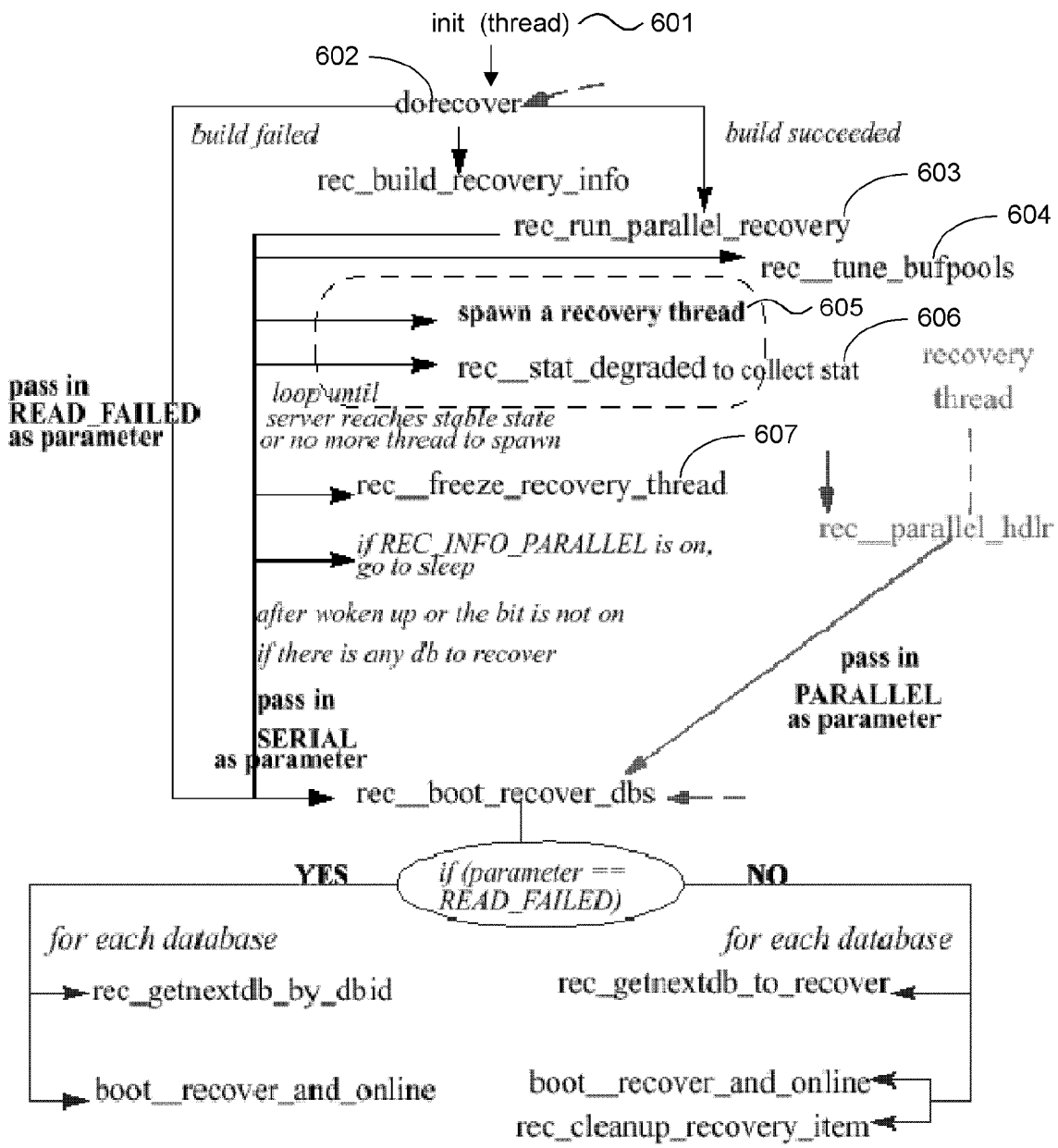
FIG. 6A is a high-level flow diagram illustrating overall control flow of the methodology of the present invention.

FIG. 6A is a high-level flow diagram illustrating overall control flow of the methodology of the present invention. As shown, the init (initial) thread 601 calls "dorecover" 602 which in turn calls "rec___run_parallel_recovery" 603. The "rec___run_parallel_recovery" 603 calls "rec___tune_bufpools" 604 to tune the default data cache for optimum recovery performance. Thereafter, "rec_run_parallel_recovery" 603 spawns a recovery thread 605 and calls "rec___stat_degraded" 606 to collect a statistic for the just-spawned thread.

Figure 6B:
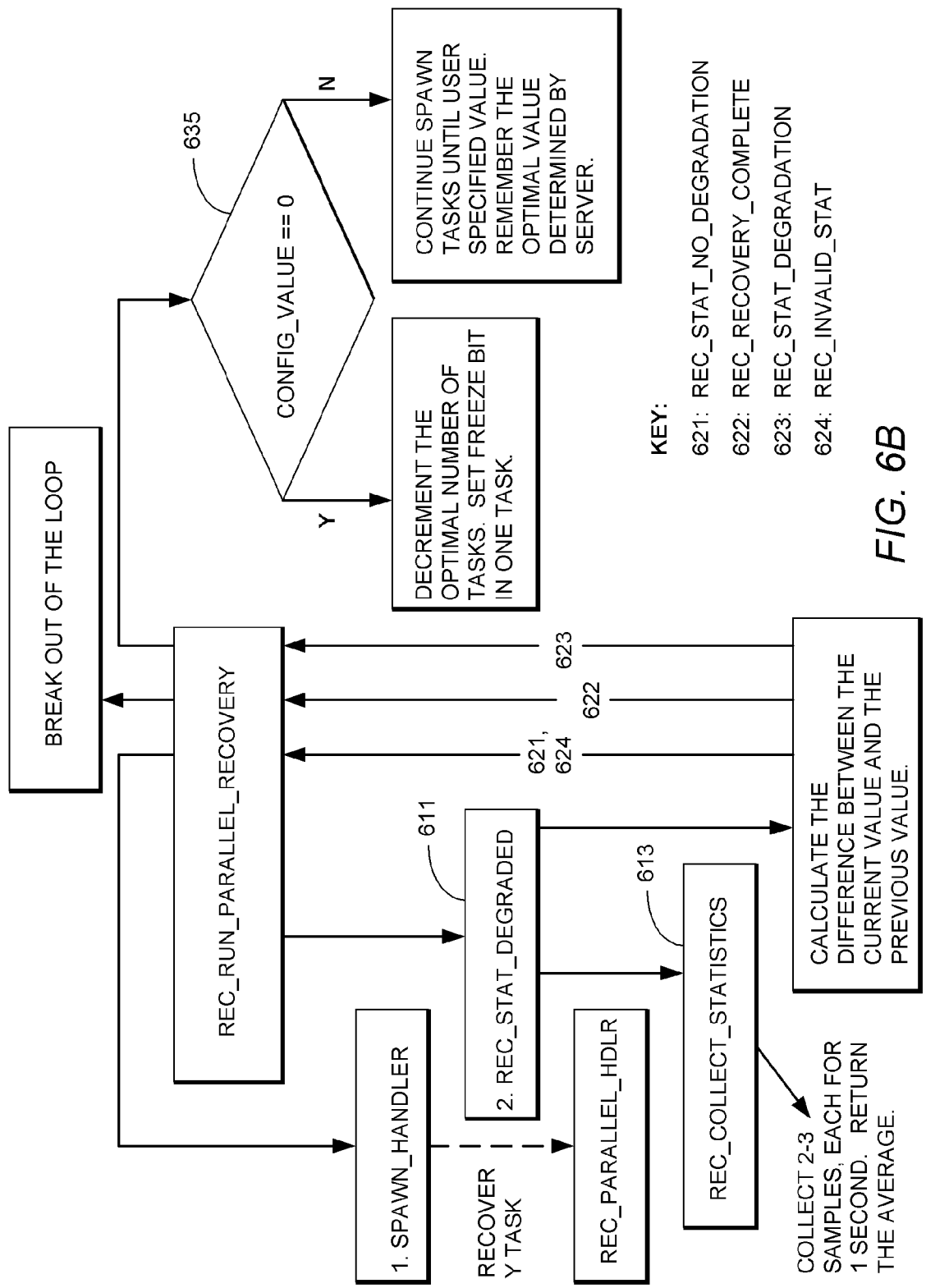
FIG. 6B is a block diagram that illustrates the core tuning portion in further detail.

FIG. 6B is a block diagram that illustrates the core tuning portion in further detail. The "rec___stat_degraded" routine 611 calls "rec___collect_statistics" 613 to collect the actual statistic values. As shown, the "rec___stat_degraded" 611 routine may return a value incorporating REC_RECOVERY_ COMPLETE 622, REC_STAT_DEGRADATION 623, REC_STAT_NO_DEGRADATION 621, and REC_INVALID_STAT 624 status bits. REC_RECOVERY_COMPLETE 622 indicates that the recovery has already completed; no tuning is necessary. REC_STAT_DEGRADATION 623 and REC_STAT_NO_DEGRADATION 621 indicate whether or not degradation occurred. Finally, REC_INVALID_STAT 624 indicates whether the gathered statistic is invalid. If there is no degradation or if there is an invalid statistic, then the system may continue to spawn another thread. In the case of REC_RECOVERY_COMPLETE 622, the recovery is complete and the routine breaks out of the loop. In the case of REC_STAT_DEGRADATION 623, however, the system has encountered performance degradation. As shown at 635 at FIG. 6B if the system encounters performance degradation and the configuration value is set to 0 (indicating the system should self-tune), the last-spawned thread is frozen. The thread is frozen by the rec___freeze_recovery_thread routine 607 which is illustrated at FIG. 6A. The parent thread itself will go to sleep while it waits for the various child threads to complete the task of recovery. When the last child (recovery) thread has finished and observes that all databases are recovered, it will wake the parent thread.

Failover Recovery

Figure 7:
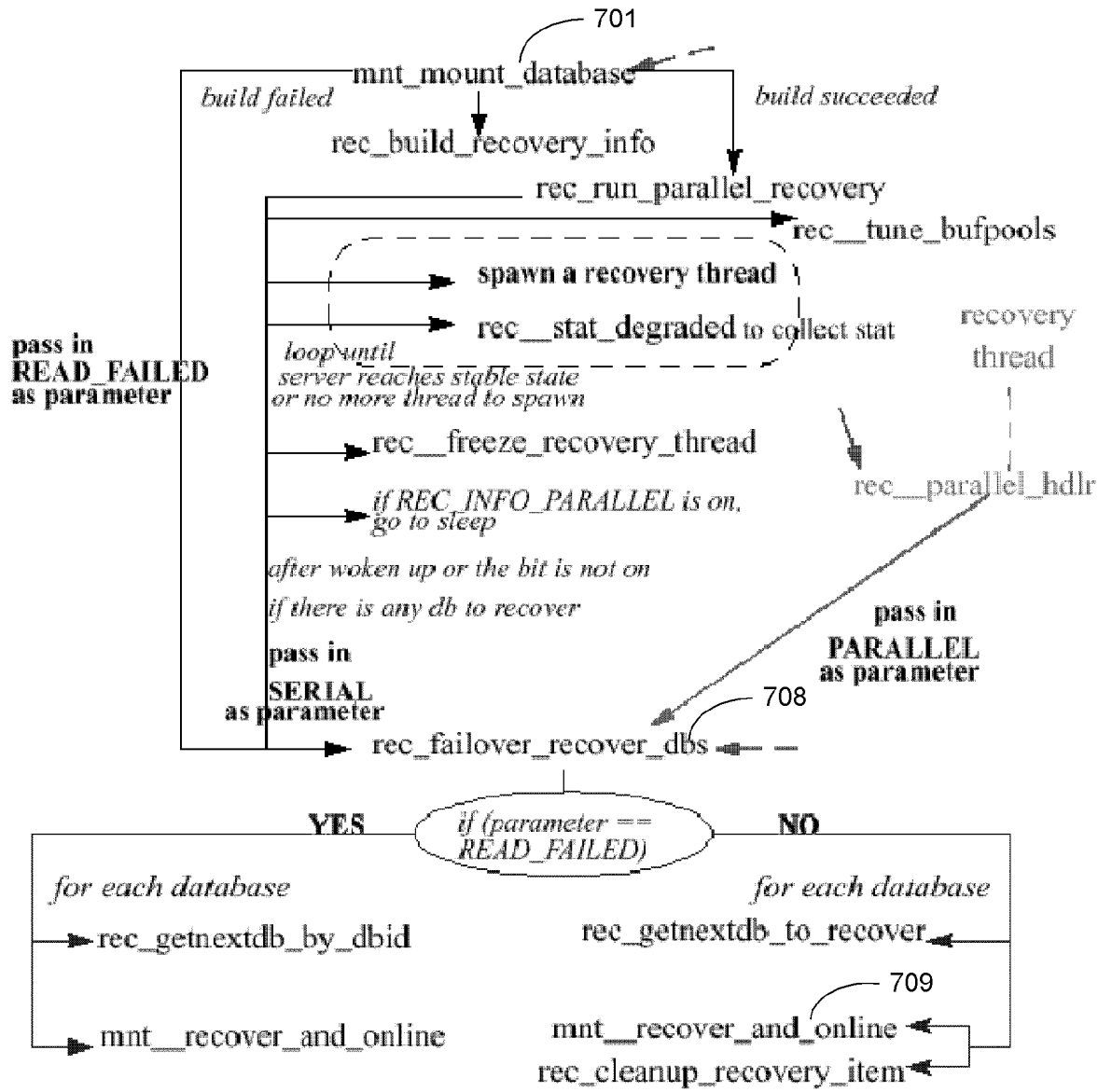
FIG. 7 is a high-level flow diagram illustrating the overall control flow of the methodology of the present invention during a failover recovery.

FIG. 7 is a high-level flow diagram illustrating the overall control flow of the methodology of the present invention during a failover recovery. The dashed arrows indicate an exception handler is installed. The major functions and operations involved during failover recovery are similar to boot recovery except for the following functions, which are unique to failover recovery:

mnt_mount_databases( ): The role of this mnt_mount_databases function 701 is similar to that of dorecover( ), which is the start up function for the recovery process.

rec_failover_recover_dbs( ): The role of this rec_failover_recover_dbs function 708 is similar to that of rec__boot_recover_dbs( ), which is the function that will loop through all databases and call the core recovery functions to recover them.

mnt___recover_and_online( ): The role of this mnt___recover_and_online function 709 is similar to that of boot___recover_and_online, which is to recover and online one database.

Tuning Default Data Cache

To tune the default data cache, two parameters are used. The first parameter is used to tune the sizes of the buffer pools in the data cache. The second parameter is used to tune asynchronous prefetch (APF). The data cache is made up of multiple pools of different I/O sizes. Consider, for instance, a database server employing a 2K data page size. In that case, the data cache will include for example a 2K (default) pool, and may also include (per DBA configuration) a 4K pool, a 8K pool, and a 16K (large) pool. The I/O size used in an access operation is dependent on the size of the pool used.

During recovery, there are two types of pages of interest: a data page and a log page. The access patterns are different for the two types of pages. Importantly, log pages tend to be accessed serially (serial access), while data pages tend to be accessed randomly (random access). Since the log pages will be accessed serially, the system may enhance performance by using larger block (e.g., 16K) I/O access. By the same token, since the data pages will be accessed randomly, it is preferable to use smaller block (e.g., 2K) I/O access. In order to take advantage of this, the system automatically tunes the default data cache. Specifically, the system automatically partitions the default data cache, one partition for log pages and another for data pages.

In use, a database system may or may not have been configured by the DBA to have the large (e.g., 16K) pool. Even in instances where the large pool exists, it may not be optimally configured. For instance, the DBA may have allocated a very large default (e.g., 2K) pool but a relatively small large (e.g., 16K) pool. In other words, the system may have a very large "small" pool and a very small "large" pool, which is not optimum for recovery performance.

In accordance with the present invention, the system applies a heuristic to determine the desired sizes of the two pools as follows:

size_of_largest_mass_pool=REC_TUNE_POOL_
        RATE*(size_of_default_pool+size_of_largest_
        mass_pool)

The size of the largest pool is set to equal 40% of the total, and the size of the default (smallest) pool is set to 60%. The log pages are bound to the largest pool, and the data pages are bound to the default pool. The recovery tuning thread calls the stored procedure "sp_do_pool_config" in order to reconfigure the pools in the default data cache for optimal recovery performance. Once recovery is complete, the original configuration is restored by calling the stored procedure again. The function "rec___tune_bufpools( )" is a workhorse function that performs the reconfiguration of the pools for optimal recovery performance.

Asynchronous Prefetch

Asynchronous prefetch (APF) is the mechanism where pages are prefetched before they are actually used, when data access patterns are known. Recovery can make use of this feature in two ways. The recovery process knows that log record access is sequential, and therefore the system may prefetch allocation units consisting of 256 pages. Secondly, from the scan of the log, the system may uncover ahead of time which data pages need to be fetched (for re-do or undo action). Therefore, the system may prefetch these data pages. The amount of such work that can be done ahead of time is characterized as the asynchronous prefetch limit. In the currently preferred embodiment, this limit is set to default value of 10%. APF helps recovery, so the system may fine-tune the APF limit to improve performance for both the default pool and the largest pool. At the end of recovery, the system returns the APF value back to the previously configured or default value. Similarly, partitioning of the default buffer cache may be returned to its pre-recovery state.

The default APF percentage of 10% is not optimal for recovery, which requires intensive I/Os. Increasing the APF percentage may show performance gains, because of less waits on synchronous I/Os. However, if the APF percentage is too high, it could saturate the pool and hit the overload condition (buffers brought in by APF are not used before they are replaced) very quickly. After some testing and tuning, a heuristic value is found to be an optimal value, "REC_OPTIMAL_APF", which is 80 (i.e., 80%). The recovery tuning thread calls "bufupdateapfpercent( )" to configure a higher APF percentage for the default pool and the large pool. When recovery is complete, the original values are restored.

Previously, data pages were not brought in if the pages are found in the PFTS table. However, it is possible that the pages on disk are not up-to-date, and therefore redo actions will have to do synchronous reads on those pages to bring them in when they are needed. To make APF more aggressive, "apf_logrecord( )" will not only check if the pages are in the PFTS table, but also compare the timestamp on the pages against that registered in the PFTS table. If the pages on disk are not up to date, they will still be brought in by APF. Also, if the log record does not contain valid timestamp information for some pages, "apf_logrecord( )" will bring the pages in without checking the PTFS table.

It should be noted that users are not allowed to change the pool configuration in default data cache during recovery. This is achieved through a new global variable "@@recovery_state" that returns the recovery state of ASE. The possible values are as follows:

NOT_IN_RECOVERY: ASE is not in boot recovery or in failover recovery. Recovery has been completed and all databases that can be online are brought online.

RECOVERY_TUNING: ASE is in recovery (either startup or failover) and is tuning ASE for optimal recovery performance.

BOOTIME_RECOVERY: ASE is in startup recovery and has completed tuning recovery for optimal performance. All databases are not brought online yet.

FAILOVER_RECOVERY: ASE is in recovery during an HA failover and has completed tuning recovery for optimal performance. All databases are not brought online yet.

The "@@recovery_state" global variable can also be used by applications to determine if all the databases are recovered and brought online.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a database system, a self-tuning method for performing recovery operations by dynamically adapting how many recovery threads are spawned during recovery, the method comprising:
    (a) spawning an initial recovery thread to perform recovery operations for at least one database that may require recovery;
    (b) measuring I/O (input/output) performance with the initial recovery thread;
    (c) spawning a subsequent recovery thread to perform recovery operations;
    (d) measuring I/O performance with the subsequent recovery thread; and
    (e) self-tuning how many threads are spawned by continuing, as long as I/O performance does not degrade beyond a preselected percentage, to repeat steps (c) and (d) for spawning a desired number of additional recovery threads and when I/O performance measured for a just-spawned recovery thread degrades beyond the preselected percentage, putting the just-spawned recovery thread to sleep;
    wherein a user of the system is able to specify a particular number of concurrent recovery threads, and wherein the system generates an advisory if the particular number of concurrent recovery threads specified can be changed to achieve better I/O performance.

2. The method of claim 1, wherein I/O performance is measured over a given period of time.

3. The method of claim 2, wherein the given period of time is about 1 second.

4. The method of claim 1, wherein steps (c) and (d) are repeated for spawning additional recovery threads, as long as I/O performance degrades by no more than about 15 percent.

5. The method of claim 1, wherein steps (c) and (d) are repeated such that only a preconfigured maximum number of recovery threads may be generated.

6. The method of claim 5, wherein the maximum number of recovery threads is limited to not exceed a count of databases that can be opened.

7. The method of claim 5, wherein the maximum number of recovery threads is limited to not exceed one less than a count of database engines online.

8. The method of claim 1, further comprising:
    after another recovery thread finishes, awaking the thread that has been put to sleep.

9. The method of claim 1, wherein steps (c) and (d) are repeated up to a configured maximum number of databases that can be recovered concurrently.

10. The method of claim 1, wherein each recovery thread itself recovers a single database at a time.

11. A computer-readable medium having processor-executable instructions for performing the method of claim 1.

12. The method of claim 1, further comprising:
    downloading a set of processor-executable instructions for performing the method of claim 1.

13. A database system performing self-tuning recovery operations by dynamically adapting how many recovery threads are spawned during recovery, the system comprising:
    a computer having at least one processor;
    a database system having at least one database that may require recovery;
    an initial recovery thread that is spawned to perform recovery operations, wherein the system measures I/O (input/output) performance with the initial recovery thread; and
    a plurality of additional recovery threads that are spawned to perform recovery operations, wherein the system dynamically adjusts how many recovery threads are spawned based on I/O (input/output) performance with each additional recovery thread that is spawned, and wherein the system ceases spawning additional recovery threads and puts a just-spawned recovery thread to sleep when I/O performance for the just-spawned recovery thread degrades beyond a desired amount;
    wherein a user of the system is able to specify a particular number of concurrent recovery threads, and wherein the system generates an advisory if the particular number of concurrent recovery threads specified can be changed to achieve better I/O performance.

14. The system of claim 13, wherein I/O performance is measured over a given period of time.

15. The system of claim 14, wherein the given period of time is about 1 second.

16. The system of claim 13, wherein the system may spawn additional recovery threads as long as I/O performance degrades by no more than about 15 percent.

17. The system of claim 13, wherein the plurality of additional recovery threads spawned is limited such that only a maximum number of recovery threads may be generated.

18. The system of claim 17, wherein the maximum number of recovery threads is limited to not exceed a count of databases to be opened.

19. The system of claim 17, wherein the maximum number of recovery threads is limited to not exceed one less than a count of database engines online.

20. The system of claim 13, wherein the system awakens the thread that has been put to sleep, upon termination of another thread.

21. The system of claim 13, wherein a maximum number of recovery threads permitted is limited to a configured maximum number of databases that can be recovered concurrently.

22. The system of claim 13, wherein each recovery thread recovers a particular database at a given point in time.

23. In a database system, an auto-tuning method for performing database recovery in a manner that dynamically adjusts how many recovery threads are spawned based on current performance, the method comprising:
    spawning a thread to perform database recovery and recording statistics about performance associated with that thread; and
    during recovery, dynamically adjusting how many threads are spawned by performing substeps of:
    attempting to spawn additional threads to perform database recovery and recording statistics about performance associated with each additional thread spawned;
    and if the performance measured for a just-spawned thread degrades beyond a desired amount, freezing execution of the just-spawned thread and ceasing any attempt to spawn additional threads for database recovery;
    wherein a user of the system is able to specify a particular number of concurrent threads, and wherein the system generates an advisory if the particular number of concurrent threads specified can be chanced to achieve better I/O performance.

24. The method of claim 23, wherein performance comprises I/O (input/output) performance measured over a given period of time.

25. The method of claim 24, wherein the given period of time is about 1 second.

26. The method of claim 23, wherein the desired amount is no more than about 15 percent degradation in performance.

27. The method of claim 23, wherein only a certain maximum number of threads may be generated for performing database recovery.

28. The method of claim 27, wherein the maximum number of threads is limited to not exceed a count of databases that may be opened.

29. The method of claim 27, wherein the maximum number of threads is limited to not exceed one less than a count of database engines online.

30. The method of claim 23, further comprising:
after another one of the threads finishes, thawing the thread that has been frozen.

31. The method of claim 23, wherein the system does not attempt to spawn more threads than a maximum number of databases available to be recovered concurrently.

32. The method of claim 23, wherein each thread recovers a particular database at a time.

33. A computer-readable medium having processor-executable instructions for performing the method of claim 23.

34. The method of claim 23, further comprising:
downloading a set of processor-executable instructions for performing the method of claim 23.

* * * * *